US012528405B2

(12) United States Patent
Kim

(10) Patent No.: US 12,528,405 B2
(45) Date of Patent: Jan. 20, 2026

(54) APPARATUS FOR PROCESSING SIGNAL, APPARATUS FOR OUTPUTTING IMAGE AND METHOD FOR PROJECTING IMAGE THEREOF

(71) Applicant: HYUNDAI MOBIS CO., LTD., Seoul (KR)

(72) Inventor: Myeong Je Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 725 days.

(21) Appl. No.: 17/674,273

(22) Filed: Feb. 17, 2022

(65) Prior Publication Data

US 2023/0219493 A1 Jul. 13, 2023

(30) Foreign Application Priority Data

Jan. 13, 2022 (KR) ........................ 10-2022-0005016

(51) Int. Cl.
*B60Q 1/50* (2006.01)
*B60Q 1/08* (2006.01)

(52) U.S. Cl.
CPC ................. *B60Q 1/50* (2013.01); *B60Q 1/08* (2013.01); *B60Q 2400/50* (2013.01)

(58) Field of Classification Search
CPC ......... G08B 13/24; G08B 13/196; G01V 3/08
See application file for complete search history.

(56) References Cited

U.S. PATENT DOCUMENTS

| | | | | |
|---|---|---|---|---|
| 2003/0067454 | A1 | 4/2003 | Shin et al. | |
| 2004/0017724 | A1* | 1/2004 | Kubota | G06F 15/7867 365/222 |
| 2004/0085446 | A1* | 5/2004 | Park | H04N 21/4408 348/E7.056 |
| 2009/0015537 | A1* | 1/2009 | Park | G09G 5/008 345/99 |
| 2009/0323828 | A1* | 12/2009 | Sugita | H04L 25/0272 375/257 |
| 2013/0221872 | A1* | 8/2013 | Gan | H05B 47/17 315/292 |
| 2014/0022383 | A1* | 1/2014 | Huang | G06T 9/00 382/232 |

FOREIGN PATENT DOCUMENTS

| | | | | |
|---|---|---|---|---|
| AT | 519864 B1 | | 11/2018 | |
| CN | 106157887 A | * | 11/2016 | G09G 3/32 |
| CN | 110914108 A | | 3/2020 | |

(Continued)

OTHER PUBLICATIONS

Office Action dated Jul. 13, 2022 issued for the corresponding German patent application No. 102022201742.0.

(Continued)

*Primary Examiner* — Rufus C Point
(74) *Attorney, Agent, or Firm* — NovoTechIP International PLLC

(57) ABSTRACT

According to an aspect of the present disclosure, a signal processing apparatus may include a processor generating an image signal and a control signal for controlling an output of the image signal and a serializer receiving the image signal and the control signal and to convert the image signal and the control signal into serial data.

14 Claims, 12 Drawing Sheets

(56) References Cited

FOREIGN PATENT DOCUMENTS

| | | | | | |
|---|---|---|---|---|---|
| CN | 212447281 | U | | 2/2021 | |
| CN | 112937464 | A | | 6/2021 | |
| CN | 113119847 | A | | 7/2021 | |
| CN | 213768392 | U | | 7/2021 | |
| JP | H09325799 | A | * | 12/1997 | |
| KR | 20000051289 | A | * | 8/2000 | ............. G09G 5/006 |
| KR | 100962415 | B1 | * | 6/2010 | |
| KR | 10-2016-0144253 | A | | 12/2016 | |
| KR | 10-2018-0129837 | A | | 12/2018 | |
| KR | 10-2019-0029011 | A | | 3/2019 | |
| WO | 2021/117983 | A1 | | 6/2021 | |

OTHER PUBLICATIONS

Office Action issued Jun. 28, 2023 in Korean priority application No. 10-2022-0005016.

Niu Yueting: "An Engineer's Field Notes: From Introduction to Practical Applications in CAN Bus Embedded Development, 2nd Edition", vol. 2, Apr. 30, 2016, Beihang University PressEdition.

Yang Zhenping: "Research on Dual-filtering Redundant CAN Bus Based on SJA1000 and DSP", Software Guide, vol. 12, No. 11, Nov. 30, 2013 (Nov. 30, 2013).

Chen Xixia: "Designing and Realizing of the Real-Time Monitoring and Fault Diagnosis System for Medical Equipments based on CAN Bus", Smart Health, Aug. 31, 2016 (Aug. 31, 2016).

Office Action dated Jun. 17, 2025 issued in corresponding Chinese Patent Application No. 202210252766.3.

* cited by examiner

APPARATUS FOR PROCESSING SIGNAL, APPARATUS FOR OUTPUTTING IMAGE AND METHOD FOR PROJECTING IMAGE THEREOF

CROSS-REFERENCE TO RELATED APPLICATIONS

This application claims the benefit of priority to Korean Patent Application No. 10-2022-0005016, filed in the Korean Intellectual Property Office on Jan. 13, 2022, the entire contents of which are incorporated herein by reference.

BACKGROUND

1. Technical Field

The present disclosure relates to a signal processing apparatus, an image outputting apparatus, and an image projecting method using the same.

2. Discussion of Related Art

In general, a vehicle's headlamp is used to ensure a stable forward view at night, in dark tunnels, in fog, or in rain.

Nowadays, as high-resolution LEDs are used increasingly, the high-resolution LEDs are also being used in the vehicle's headlamp. Accordingly, technologies and applications are being developed to project an image onto a road surface or specific object by using the vehicle's headlamp.

The headlamp using a high-resolution LED requires numerous automotive parts as compared to a general headlamp. Accordingly, a plurality of micro-controlling units (MCUs) is required to control the automotive parts.

SUMMARY

The present disclosure has been made to solve the above-mentioned problems occurring in the prior art while advantages achieved by the prior art are maintained intact.

When a headlamp for projecting an image onto a road surface or specific object by using a high-resolution LED is separately equipped with a MCU for controlling the headlamp for each automotive part, a material cost is increased as the number of MCUs increased.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a signal processing apparatus may include a processor generating an image signal and a control signal for controlling an output of the image signal and a serializer receiving the image signal and the control signal and to convert the image signal and the control signal into serial data.

According to an embodiment, the serializer may include an image interface generating image data based on the image signal, a control interface generating control data based on the control signal, and an encoder encrypting the image data and the control data.

According to an aspect of the present disclosure, an image outputting apparatus may include a signal processing module generating an image signal and a control signal for controlling an output of the image signal and transmitting the image signal and the control signal and at least one driver module receiving the image signal and the control signal and controlling an output of an image based on the image signal.

According to an embodiment, the image outputting apparatus may further include an output module outputting the image.

According to an embodiment, the at least one driver module may include a first driver module and a second driver module.

The output module may include a first output module and a second output module. The first driver module may control the first output module, and the second driver module may control the second output module.

According to an embodiment, the driver module may include an address value setting circuit. The address value setting circuit may be configured such that the first driver module has a first address value and the second driver module has a second address value.

According to an embodiment, the address value setting circuit may include a pull-up resistor and a pull-down resistor.

According to an embodiment, the signal processing module may transmit a query signal to the first address value or the second address value. The first driver module or the second driver module may transmit an acknowledgement signal to the signal processing module when the first driver module or the second driver module receives the query signal.

According to an embodiment, the signal processing module may transmit the query signal to the first address value in a state where the first driver module is in an on state and the second driver module is in an off state. The signal processing module may transmit the query signal to the second address value in a state where the first driver module is in an off state and the second driver module is in an on state. The first driver module or the second driver module may transmit the acknowledgement signal to the signal processing module when the first driver module or the second driver module receives the query signal.

According to an embodiment, the signal processing module may generate the control signal based on state information of the output module or the at least one driver module.

According to an embodiment, the state information may include at least one of temperature information, abnormality information, and voltage level information.

According to an embodiment, the signal processing module may include a processor generating the image signal and the control signal for controlling an output of the image signal and a serializer receiving the image signal and the control signal and converting the image signal and the control signal into serial data.

According to an embodiment, the at least one driver module may include a de-serializer receiving the serial data and converting the serial data into parallel data and a driver integrated circuit (IC) controlling the output of the image based on the parallel data.

According to an embodiment, the signal processing module and the at least one driver module may communicate with each other remotely.

According to an embodiment, the signal processing module and the at least one driver module may communicate with each other through one transmission line.

According to an embodiment, the image outputting apparatus may further include an electronic device. The driver module and the signal processing module may communicate with each other through a first communication network. The driver module and the electronic device may communicate with each other through a second communication network.

According to an embodiment, the electronic device may include at least one of a DC-DC converter, a temperature sensor, a motor, and a voltage sensor.

According to an embodiment, the signal processing module and the at least one driver module may communicate with each other based on an asynchronous control method.

According to an embodiment, the signal processing module may transmit the control signal to the at least one driver module through a low frequency band and may transmit the image signal to the at least one driver module through a high frequency band.

According to an aspect of the present disclosure, an image projecting method may include generating an image signal and a control signal for controlling an output of the image signal and transmitting the image signal and the control signal and receiving the image signal and the control signal and controlling an image output based on the image signal.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
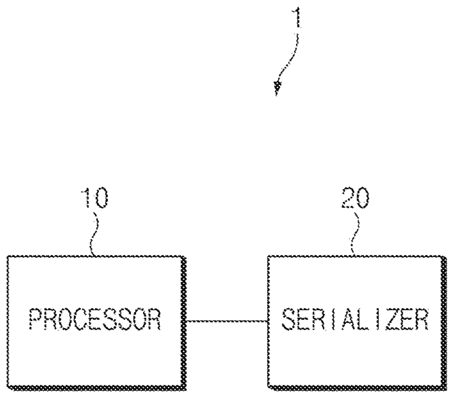
FIG. 1 is a diagram illustrating a signal processing apparatus, according to an embodiment of the present disclosure.

Hereinafter, various embodiments of the present disclosure will be described with reference to accompanying drawings. However, those of ordinary skill in the art will recognize that modification, equivalent, and/or alternative on various embodiments described herein may be variously made without departing from the scope and spirit of the disclosure.

In this specification, the singular form of the noun corresponding to an item may include one or more of items, unless interpreted otherwise in context. In the disclosure, the expressions "A or B," "at least one of A and B," "at least one of A or B", "A, B, or C", "at least one of A, B, and C", and "at least one of A, B, or C" may include any and all combinations of one or more of the associated listed items. The terms, such as "first" or "second" may be used to simply distinguish the corresponding component from the other component, but do not limit the corresponding components in other aspects (e.g., importance or order). When a component (e.g., a first component) is referred to as being "coupled with/to" or "connected to" another component (e.g., a second component) with or without the term of "operatively" or "communicatively", it may mean that a component is connectable to the other component, directly (e.g., by wire), wirelessly, or through the third component.

Each component (e.g., a module or a program) of components described in this specification may include a single entity or a plurality of entities. According to various embodiments, one or more components of the corresponding components or operations may be omitted, or one or more other components or operations may be added. Alternatively or additionally, a plurality of components (e.g., a module or a program) may be integrated into one component. In this case, the integrated component may perform one or more functions of each component of the plurality of components in the manner same as or similar to being performed by the corresponding component of the plurality of components prior to the integration. According to various embodiments, operations executed by modules, programs, or other components may be executed by a successive method, a parallel method, a repeated method, or a heuristic method. Alternatively, at least one or more of the operations may be executed in another order or may be omitted, or one or more operations may be added.

The term "module" or ". . . unit" used herein may include a unit, which is implemented with hardware, software, or firmware, and may be interchangeably used with the terms "logic," "logical block," "part," or "circuit." The "module" may be a minimum unit of an integrated part or may be a minimum unit of the part for performing one or more functions or a part thereof. For example, according to an embodiment, the module may be implemented in the form of an application-specific integrated circuit (ASIC).

Various embodiments of the present disclosure may be implemented with software (e.g., a program or an application) including one or more instructions stored in a storage medium (e.g., a memory) readable by a machine. For example, the processor of a machine may call at least one instruction of the stored one or more instructions from a storage medium and then may execute the at least one instruction. This enables the machine to operate to perform at least one function depending on the called at least one instruction. The one or more instructions may include a code generated by a complier or a code executable by an interpreter. The machine-readable storage medium may be provided in the form of a non-transitory storage medium. Herein, 'non-transitory' just means that the storage medium is a tangible device and does not include a signal (e.g., electromagnetic waves), and this term does not distinguish between the case where data is semi-permanently stored in the storage medium and the case where the data is stored temporarily.

FIG. 1 is a diagram illustrating a signal processing apparatus, according to an embodiment of the present disclosure.

Referring to FIG. 1, the signal processing apparatus 1 may include a processor 10 and a serializer 20.

According to an embodiment, the processor 10 may generate an image signal and a control signal for controlling an output of the image signal. For example, the image signal may include pixel data and/or color data for outputting an image.

According to an embodiment, the serializer 20 may receive an image signal and a control signal and may convert the image signal and the control signal into serial data. For example, the serial data may include data serially arranged in units of one bit. The serializer 20 will be described in more detail with reference to FIG. 2 below.

According to an embodiment, the signal processing apparatus 1 may transmit the image signal and the control signal to an external device (e.g., a driver). The signal processing apparatus 1 may communicate with the external device based on a serial communication method, and may include a communication interface, an antenna, and the like, which are used for communication. The signal processing apparatus 1 may sequentially transmit the serial data to the external device in arbitrary bit units (e.g., 1 bit unit). The signal processing apparatus 1 may transmit the serial data based on the image signal and the control signal to the external device, and thus may not include a separate device (e.g., MCU) for delivering the control signal to the external device.

Figure 2:
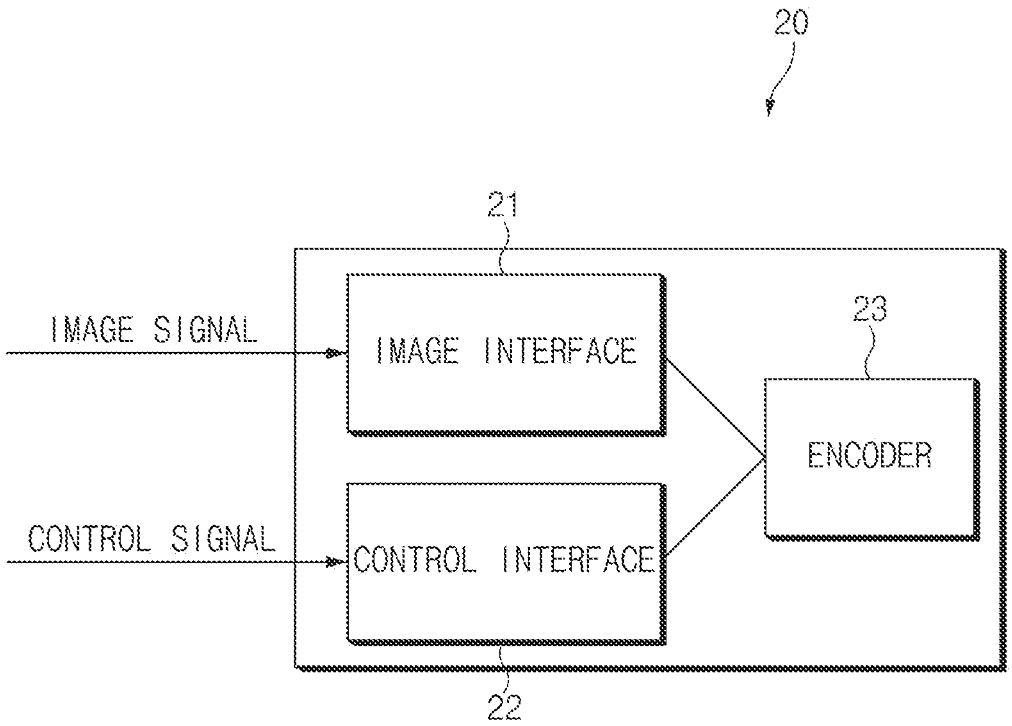
FIG. 2 is a diagram illustrating a serializer, according to an embodiment of the present disclosure.

Referring to FIG. 2, the serializer 20 may include an image interface 21, a control interface 22, and an encoder 23.

According to an embodiment, the image interface 21 may generate image data based on an image signal, and the control interface 22 may generate control data based on a control signal. According to an embodiment, the image interface 21 may convert the image signal into serial data, and the control interface 22 may convert the control signal into serial data. Each of the image data and the control data may constitute a part of the serial data.

According to an embodiment, the encoder 23 may encrypt the image data and the control data. According to an embodiment, the signal processing apparatus 1 may communicate with an external device, and the encoder 23 may process data to prevent data loss in a communication process.

Figure 3:
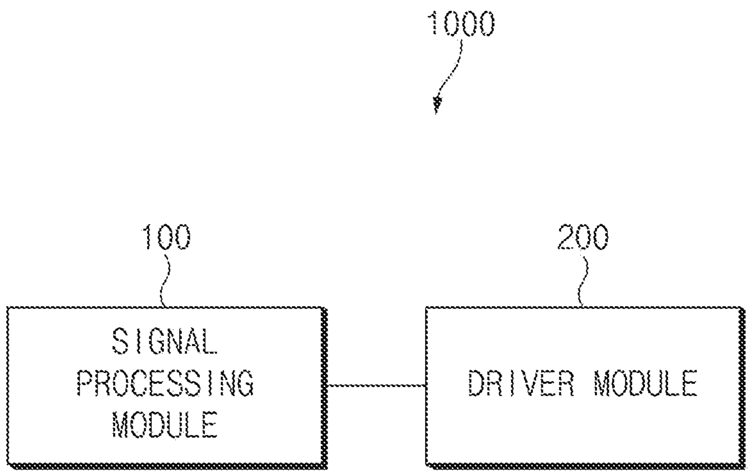
FIG. 3 is a diagram illustrating an image outputting apparatus, according to an embodiment of the present disclosure.

FIG. 3 is a diagram illustrating an image outputting apparatus, according to an embodiment of the present disclosure.

Referring to FIG. 3, the image outputting apparatus 1000 may include a signal processing module 100 and at least one driver module 200. The signal processing module 100 illustrated in FIG. 3 may be substantially the same as the signal processing apparatus 1 illustrated in FIG. 1.

According to an embodiment, the signal processing module 100 may generate an image signal and a control signal for controlling an output of the image signal. The signal processing module 100 may generate the image signal and the control signal. Accordingly, the image outputting apparatus 1000 may not include a separate device (e.g., MCU) for generating the control signal.

According to an embodiment, the signal processing module 100 may transmit the image signal and the control signal. For example, the signal processing module 100 may transmit the image signal and the control signal to the driver module 200. According to an embodiment, the signal processing module 100 may include a communication interface, an antenna, and the like, which are used to transmit and receive signals.

According to an embodiment, the driver module 200 may receive the image signal and the control signal and may control the output of an image generated from the image signal. For example, the driver module 200 may receive an image signal and may control an output module 300 to output an image generated from the image signal. The output module 300 may be controlled based on the control signal.

According to an embodiment, the signal processing module 100 and the driver module 200 may communicate with each other by wire or wirelessly. According to an embodiment, the signal processing module 100 and the driver module 200 may communicate with each other remotely, and may communicate with each other through one transmission line. For example, the transmission line may include a structure for transmitting a signal from one point to another point. When the signal processing module 100 transmits the image signal and the control signal through one transmission line, the cost may be reduced as compared to a case of transmitting the image signal and the control signal through different transmission lines.

Figure 4:
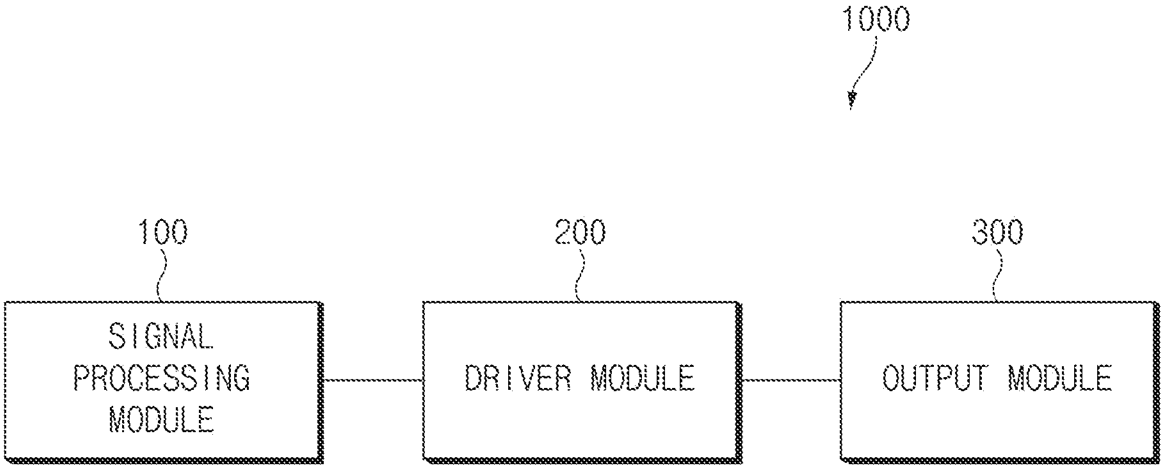
FIG. 4 is a diagram illustrating an image outputting apparatus further including an output module, according to an embodiment of the present disclosure.

FIG. 4 is a diagram illustrating an image outputting apparatus further including an output module, according to an embodiment of the present disclosure.

Referring to FIG. 4, the image outputting apparatus 1000 may further include the output module 300. According to an embodiment, the image outputting apparatus 1000 illustrated in FIG. 4 may further include the output module 300 as compared with the image outputting apparatus 1000 illustrated in FIG. 3.

According to an embodiment, the output module 300 may output an image. The output module 300 may include various lamps, for example, a headlamp, a rear lamp, a tail lamp, and the like, which are present in a vehicle. The output module 300 may be a headlamp of the vehicle, and the headlamp may include a high-resolution headlamp using a digital micro-mirror device (DMD) and LED MATRIX. In this case, the output module 300 may be composed of a plurality of LED light sources. The output module 300 may output an image by turning on each LED light source and may display the image on a road surface or specific object. According to an embodiment, the output module 300 may include a power module (not shown) that supplies power to each LED light source.

Figure 5:
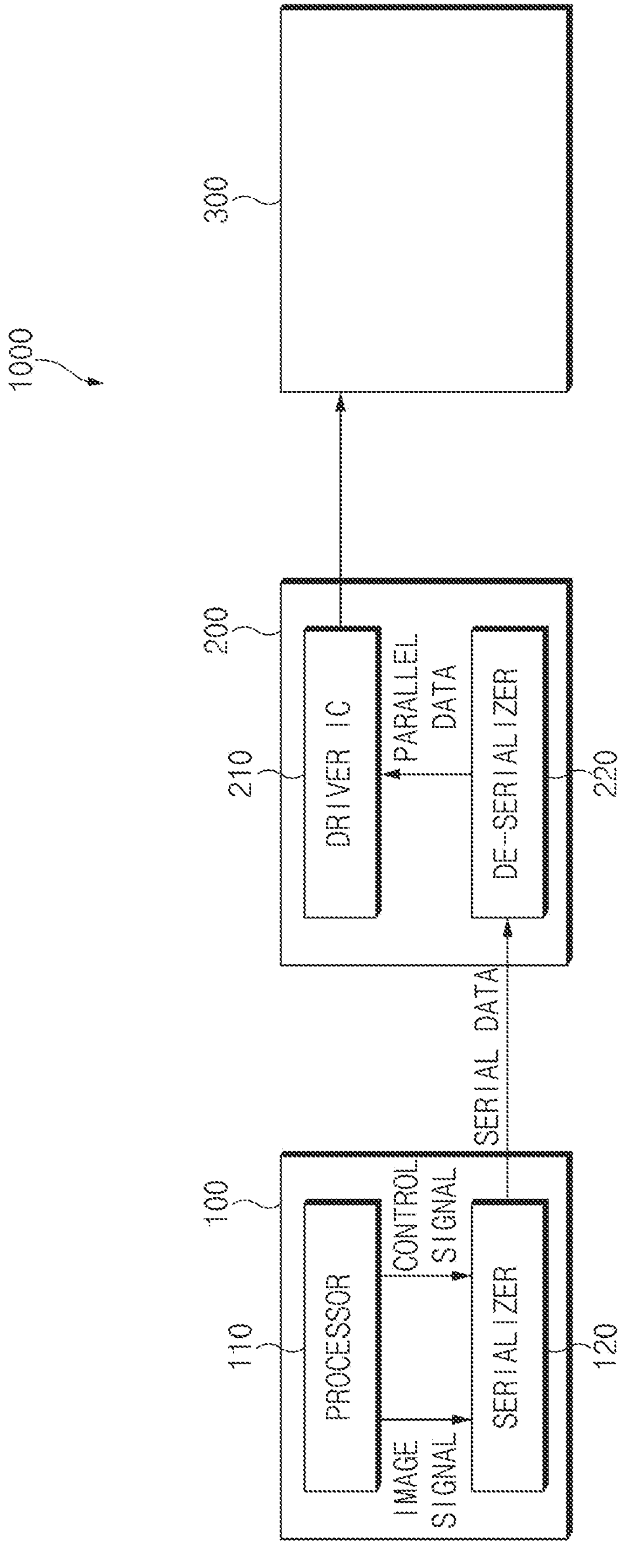
FIG. 5 is a diagram illustrating an image outputting apparatus, according to another embodiment of the present disclosure.

FIG. 5 is a diagram illustrating an image outputting apparatus, according to another embodiment of the present disclosure.

Referring to FIG. 5, the signal processing module 100 may include a processor 110 and a serializer 120, and the driver module 200 may include a driver IC 210 and a de-serializer 220.

According to an embodiment, the processor 110 may generate an image signal and a control signal for controlling an output of the image signal. The control signal may include lighting information of a LED light source, driver address setting information, and the like. The image signal may include pixel data and/or color data (e.g., RGB data) for generating an image.

According to an embodiment, the serializer 120 may receive the image signal and the control signal and may convert the image signal and the control signal into serial data. The serializer 120 may convert the image signal and the control signal into the serial data. The signal processing module 100 may sequentially transmit the serial data in arbitrary bit units (e.g., 1-bit unit). As such, the signal processing module 100 may transmit the image signal and the control signal to the driver module 200 based on a serial communication method.

According to an embodiment, the de-serializer 220 may receive serial data and may convert the serial data into parallel data. The de-serializer 220 may receive the serial data transmitted by the signal processing module 100 bit by bit and may convert the serial data into parallel data by arranging bits constituting data in parallel. The driver module 200 may control an image output by simultaneously processing data based on the parallel data converted by the de-serializer 220. The parallel data may be substantially the same as the image signal and control signal, which are generated by the processor 110.

According to an embodiment, the driver IC 210 may control an output of the image based on the parallel data. The driver IC 210 may obtain information about an image to be output from the parallel data. The driver IC 210 may control the output module 300 so as to output an image based on an image signal. For example, the driver IC 210 may control the lighting of each LED light source of the output module 300 to output an image generated from an image signal.

Figure 6:
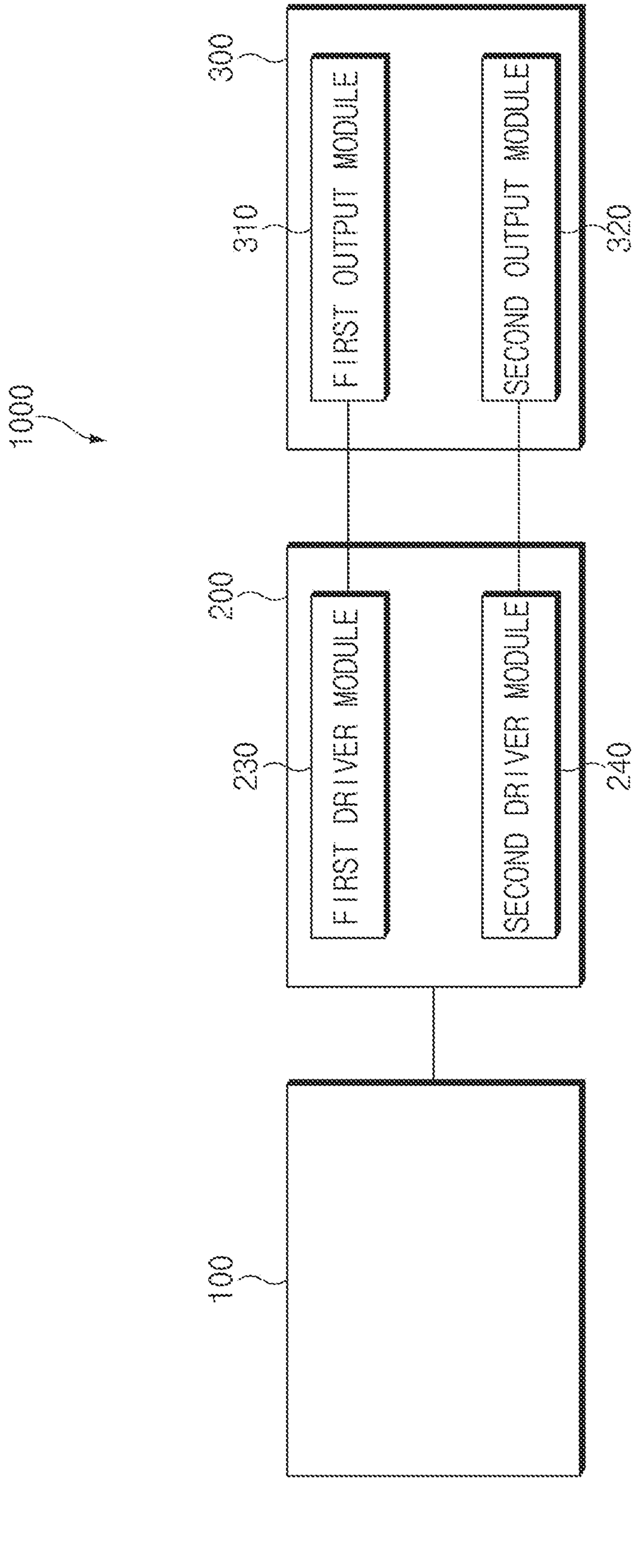
FIG. 6 is a diagram illustrating an image outputting apparatus, according to still another embodiment of the present disclosure.

FIG. 6 is a diagram illustrating an image outputting apparatus, according to still another embodiment of the present disclosure.

Referring to FIG. 6, the driver module 200 may include a first driver module 230 and a second driver module 240. The output module 300 may include a first output module 310 and a second output module 320.

According to an embodiment, the output module 300 may include a headlamp. At this time, the first output module 310 may include a left headlamp, and the second output module 320 may include a right headlamp.

According to an embodiment, the driver module 200 may include the first driver module 230 and the second driver module 240. At this time, the first driver module 230 may control the first output module 310, and the second driver module 240 may control the second output module 320.

FIG. 6 illustrates that the driver module 200 and the output module 300 are two, but are not limited thereto. For example, the driver module 200 and the output module 300 may consist of three or more modules. According to an embodiment, the number of driver modules 200 may be the same as the number of output modules 300. At this time, the driver modules 200 may respectively correspond to the output modules 300 so as to respectively control the output modules 300.

Figure 7:
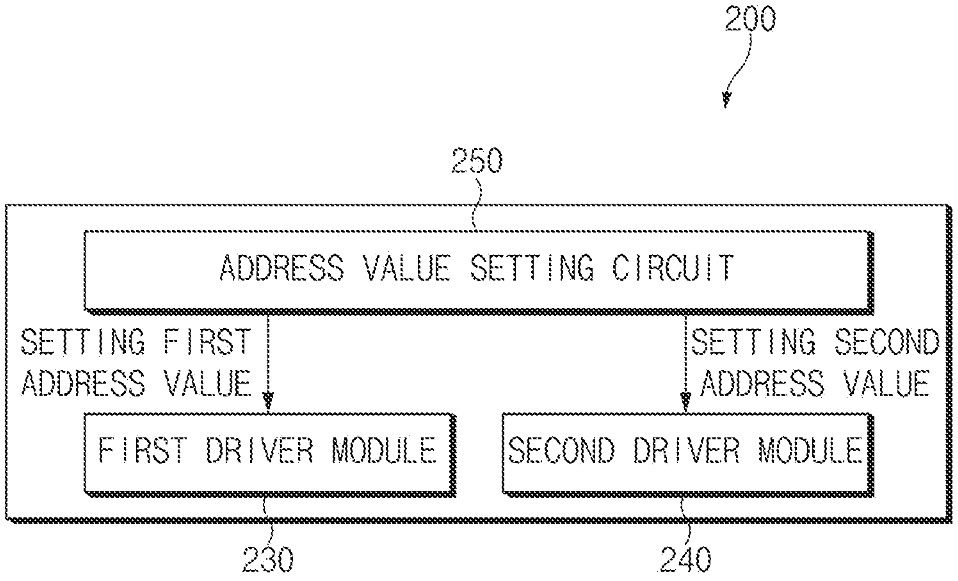
FIG. 7 is a diagram illustrating a driver module including an address value setting circuit, according to an embodiment of the present disclosure.

FIG. 7 is a diagram illustrating a driver module including an address value setting circuit, according to an embodiment of the present disclosure.

Referring to FIG. 7, the driver module 200 may include an address value setting circuit 250.

According to an embodiment, the address value setting circuit 250 may set an address value of the first driver module 230 as a first address value, and may set an address value of the second driver module 240 as a second address value. In this case, the first address value and the second address value may have different address values.

According to an embodiment, the address value setting circuit 250 may differently set the address values of the first driver module 230 and the second driver module 240. The signal processing module 100 may transmit an image signal and a control signal to only a specific driver module, which desires to be controlled, from among the first driver module 230 and the second driver module 240. For example, the signal processing module 100 may transmit an image signal and a control signal to only the first address value such that the first driver module 230 controls the first output module 310. Moreover, the signal processing module 100 may transmit the image signal and the control signal to both the first address value and the second address value such that the first driver module 230 controls the first output module 310, and, at the same time, the second driver module 240 controls the second output module 320.

Figure 8:
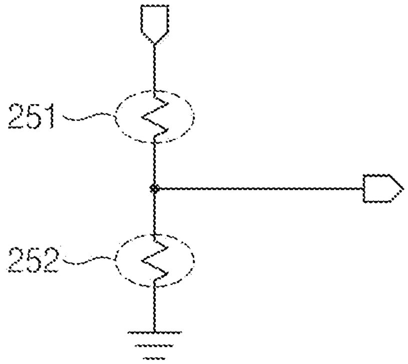
FIG. 8 is a diagram illustrating an example of an address value setting circuit, according to an embodiment of the present disclosure.

FIG. 8 is a diagram illustrating an example of an address value setting circuit, according to an embodiment of the present disclosure.

Referring to FIG. 8, the address value setting circuit 250 may include a pull-up resistor 251 and a pull-down resistor 252.

According to an embodiment, the address value setting circuit 250 may set an address value by measuring a voltage applied to an input terminal or an output terminal through the pull-up resistor 251 and the pull-down resistor 252. For example, when the voltage applied to the input terminal is high (e.g., 5 V), the address value setting circuit 250 may set the address value to "0x01". When the voltage is low (e.g., 0 V), the address value setting circuit 250 may set the address value to "0x00".

Figure 9:
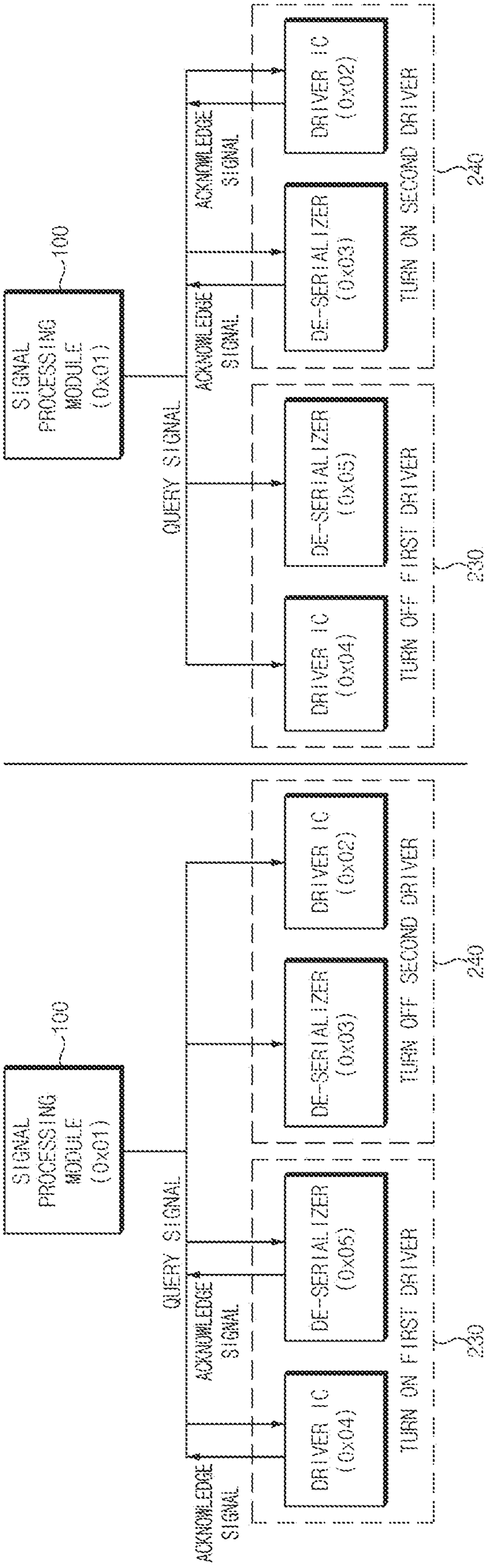
FIG. 9 is a diagram illustrating a process in which an image outputting apparatus determines whether there is an error in settings of an address value of a driver module, according to an embodiment of the present disclosure.

FIG. 9 is a diagram illustrating a process in which an image outputting apparatus determines whether there is an error in settings of an address value of a driver module, according to an embodiment of the present disclosure.

Referring to FIG. 9, the image outputting apparatus 1000 may determine whether there is an error in settings of an address value of the driver module 200, through a process in which the signal processing module 100 transmits a query signal to the driver module 200, and the driver module 200 receiving the query signal transmits an acknowledgement signal to the signal processing module 100.

Even though address values of the first driver module 230 and the second driver module 240 are swapped (e.g., when the first driver module 230 has a second address value, and the second driver module 240 has a first address value), because a set ({first address value, second address value}) of address values of the first driver module 230 and the second driver module 240 are the same, the signal processing module 100 and the driver module 200 may communicate with each other normally. However, the image output through the output module 300 may be different from the intended image output when the signal processing module 100 generates an image signal and a control signal. For example, the signal processing module 100 transmits the image signal and the control signal to the first address value for the purpose of controlling the first driver module 230. However, when the second driver module 240 has the first address value, the image signal and the control signal may be transmitted to the second driver module 240, and thus an image may be unintentionally output through the second output module 320. Accordingly, it is necessary to determine whether the address values of the first driver module 230 and the second driver module 240 are properly set to the first address value and the second address value, respectively.

To this end, according to an embodiment, the signal processing module 100 may transmit a query signal to the first address value or the second address value. At this time, when receiving the query signal, the first driver module 230 or the second driver module 240 may transmit an acknowledgement signal to the signal processing module 100. The signal processing module 100 may determine whether there is an error in settings of the address value of the driver module 200, based on the acknowledgement signal transmitted by the first driver module 230 or the second driver module 240.

For example, the signal processing module 100 transmits a query signal to the first address value. When the acknowledgement signal does not return to the signal processing module 100 or the acknowledgement signal is returned from the second driver module 240, the signal processing module 100 may identify that the address value is matched incorrectly with the driver module 200. At this time, the driver module 200 may reset the address values of the first driver module 230 and the second driver module 240 through the address value setting circuit 250.

According to an embodiment, in a state where the first driver module 230 is in an ON state, and the second driver module 240 is in an OFF state, the signal processing module 100 may transmit a query signal to the first address value. When the first driver module 230 is in an OFF state, and the second driver module 240 is in an ON state, the signal processing module 100 may transmit a query signal to the second address value. When receiving a query signal, the first driver module 230 or the second driver module 240 may transmit the acknowledgement signal to the signal processing module 100.

When the signal processing module 100 transmits a query signal in a state where both the first driver module 230 and the second driver module 240 are turned on, an error may occur in a process of transmitting a query signal or in a process in which the driver module 200 transmits an acknowledgement signal. In this case, it may be inaccurate for the signal processing module 100 to determine whether there is an error in settings of an address value of the driver module 200, based on the acknowledgement signal. Accordingly, the image outputting apparatus 1000 may sequentially turn on the first driver module 230 and the second driver module 240 such that the signal processing module 100 transmits a query signal. Accordingly, the image outputting apparatus 1000 may accurately determine whether there is an error in settings of an address value of the driver module 200.

According to an embodiment, the signal processing module 100 may generate a control signal based on state information of the output module 300 or the driver module 200. According to an embodiment, the state information may include at least one of temperature information, abnormality information, and voltage level information. Besides, the state information may include information capable of directly or indirectly indicating the state of the output module 300 or the driver module 200. For example, when it is determined that the temperature of the output module 300 is higher than a reference, based on the temperature information of the output module 300, the signal processing module 100 may generate a control signal for controlling a current flowing in a circuit of the output module 300.

Figure 10:
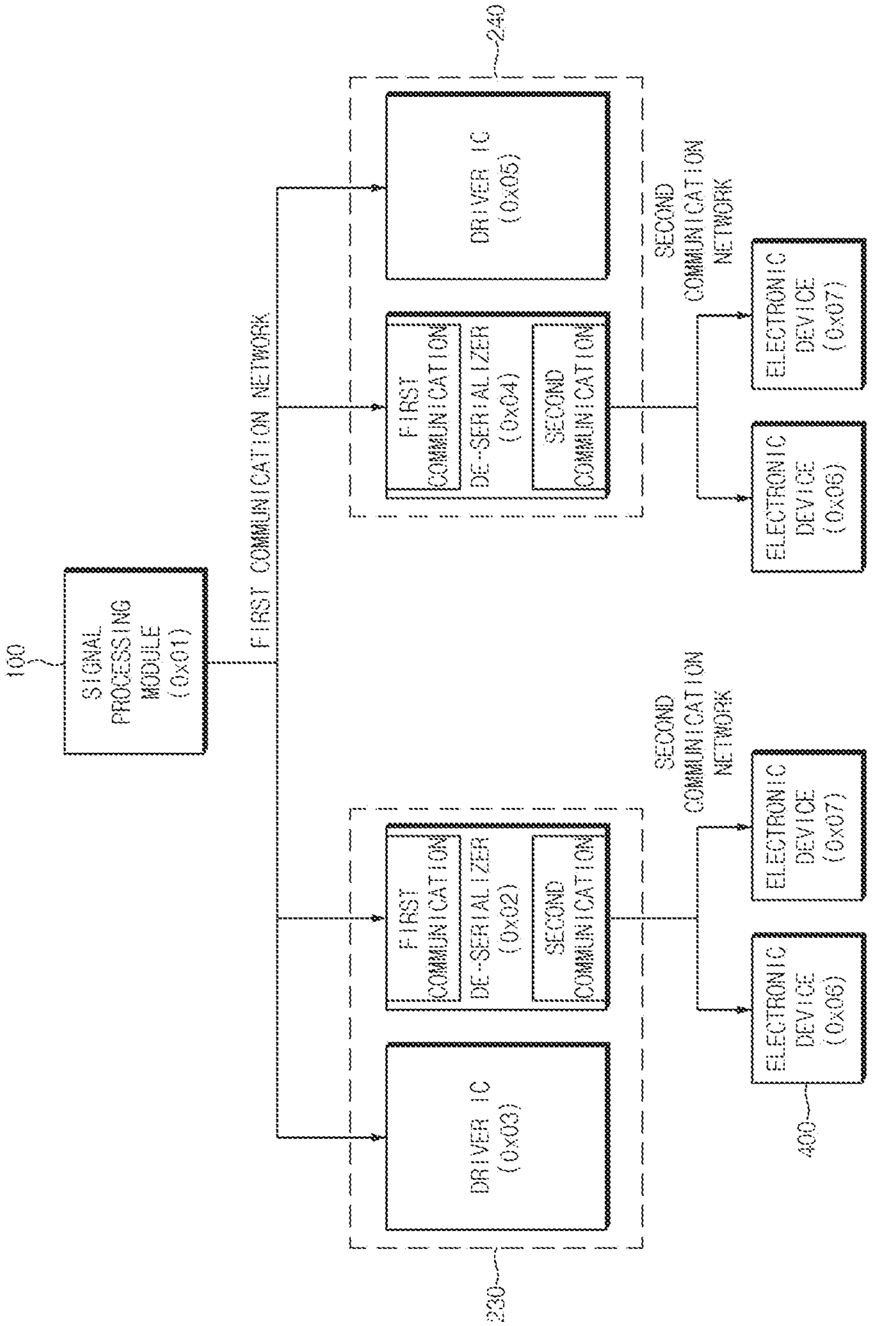
FIG. 10 is a diagram illustrating a configuration of a plurality of communication networks of an image outputting apparatus, according to an embodiment of the present disclosure.

FIG. 10 is a diagram illustrating a configuration of a plurality of communication networks of an image outputting apparatus, according to an embodiment of the present disclosure.

Referring to FIG. 10, the image outputting apparatus 1000 may organize a plurality of communication networks.

According to an embodiment, the image outputting apparatus 1000 may further include an electronic device 400. FIG. 10 illustrated that there are four electronic devices 400, but this is only an example. An embodiment is not limited thereto. According to an embodiment, the electronic device 400 may include at least one of a DC-DC converter, a temperature sensor, a motor, and a voltage sensor. Besides, the electronic device 400 may include various devices capable of being provided in a vehicle.

According to an embodiment, the driver module 200 and the signal processing module 100 may communicate with each other through a first communication network. The driver module 200 and the electronic device 400 may communicate with each other through a second communication network. According to an embodiment, the driver module 200 may receive information from the electronic device 400 through the second communication network and then may deliver the received information to the signal processing module 100 through the first communication network. For example, when the electronic device 400 is a temperature sensor, the driver module 200 may receive temperature information detected by the temperature sensor through the second communication network and then may deliver the received temperature information to the signal processing module 100 through the first communication network. At this time, the signal processing module 100 may control the temperature by generating and transmitting a control signal based on the temperature information received from the driver module 200. The communication networks may be separated in the communication between the signal processing module 100, the driver module 200, and the electronic device 400, thereby preventing communication collisions and errors and preventing erroneous control due to communication collisions and errors.

Figure 11:
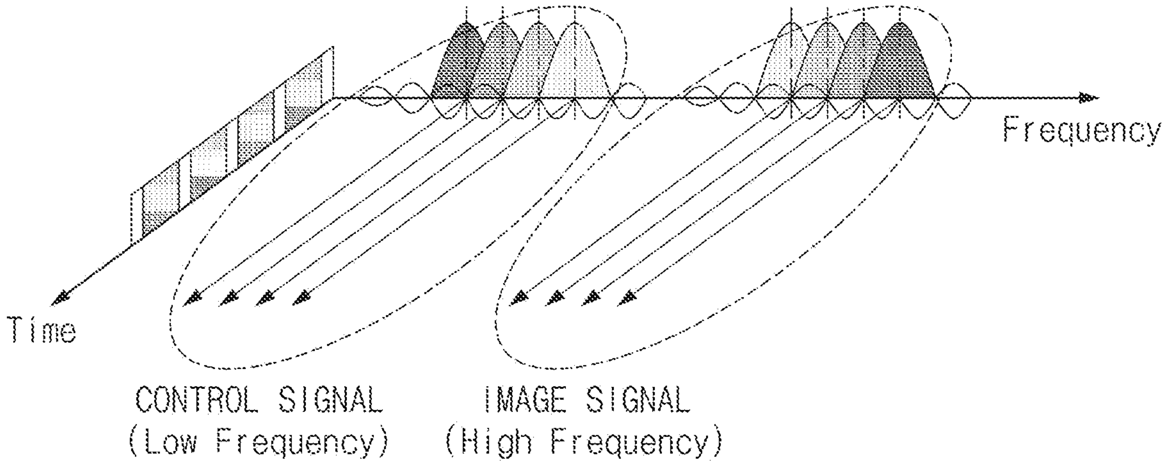
FIG. 11 is a diagram illustrating an example of communication based on an asynchronous control method of an image outputting apparatus, according to an embodiment of the present disclosure.

FIG. 11 is a diagram illustrating an example of communication based on an asynchronous control method of an image outputting apparatus, according to an embodiment of the present disclosure.

Referring to FIG. 11, the image outputting apparatus 1000 may communicate based on an asynchronous control method.

According to an embodiment, the signal processing module 100 and the driver module 200 may communicate with each other based on the asynchronous control method. The asynchronous control method may include a method of communicating by using a predefined signal without transmitting data at a constant speed in a communication process.

According to an embodiment, the signal processing module 100 may transmit a control signal to the driver module 200 through a low frequency band and may transmit an image signal to the driver module 200 through a high frequency band. For example, the low frequency band may include a frequency of 500 KHz or less, and the high frequency band may include a frequency of 1 GHz or more.

According to an embodiment, the signal processing module 100 may have two channels in one transmission line to transmit an image signal and a control signal to the driver module 200, and may separately transmit/receive the image signal and the control signal through the two channels. In this case, the control signal having a small amount of data may communicate through a low frequency band, and the image signal having a large amount of data may communicate through a high frequency band.

Figure 12:
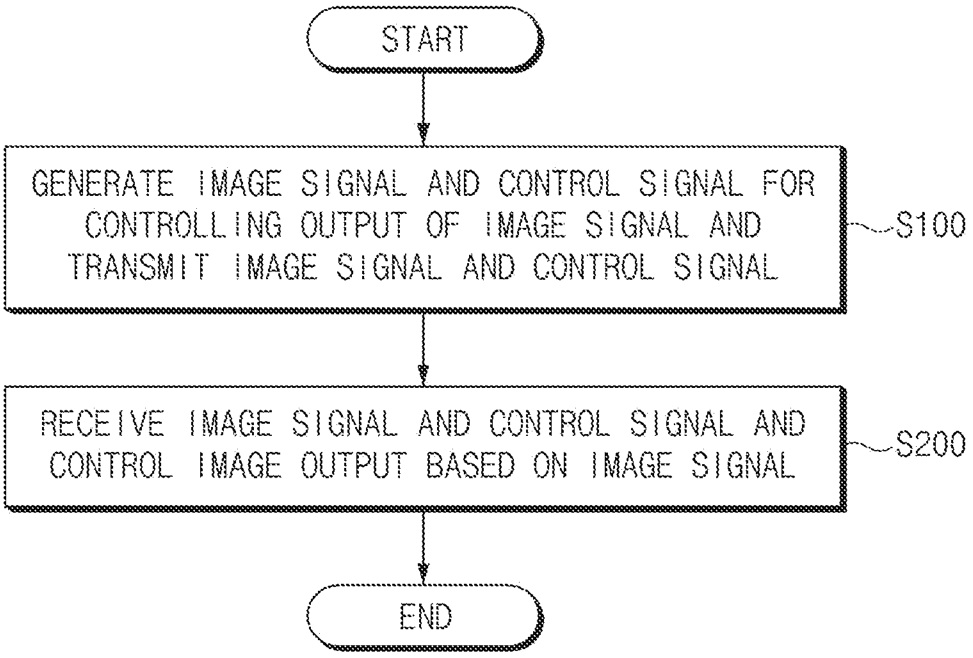
FIG. 12 is a flowchart illustrating an image projecting method, according to an embodiment of the present disclosure.

FIG. 12 is a flowchart illustrating an image projecting method, according to an embodiment of the present disclosure.

Referring to FIG. 12, an image projecting method may include step S100 of generating an image signal and a control signal for controlling the output of the image signal, and transmitting the image signal and the control signal and step S200 of receiving the image signal and the control signal and controlling an image output based on the image signal.

In step S100, the signal processing module 100 may generate an image signal and a control signal for controlling an output of the image signal. According to an embodiment, the signal processing module 100 may include the processor 110, and the processor 110 may generate the image signal and the control signal.

The signal processing module 100 may transmit the image signal and the control signal to the driver module 200. The serializer 120 may convert the image signal and the control signal into serial data and may deliver the serial data to the driver module 200 based on a serial communication method.

In step S200, the driver module 200 may receive the image signal and the control signal and then may control an image output. According to an embodiment, the driver module 200 may include the driver IC 210. The driver IC 210 may control the image output based on the image signal and the control signal.

The driver module 200 may include the de-serializer 220. The de-serializer 220 may receive serial data and may convert the serial data into parallel data. The de-serializer 220 may receive the serial data transmitted by the signal processing module 100 bit by bit and may convert the serial data into parallel data by arranging bits constituting data in parallel. The driver module 200 may control an image output by simultaneously processing data based on the parallel data converted by the de-serializer 220. The parallel data may be substantially the same as the image signal and control signal, which are generated by the processor 110.

In the above, even though all components constituting an embodiment disclosed in the specification are described as being combined to one or operating in combination, embodiments disclosed in the specification are not necessarily limited to the embodiment. That is, within the scope of embodiments disclosed in the specification, all components may be selectively combined and may perform a function(s).

In addition, the terms such as "comprise," "include," and "have" described above mean that the corresponding component may be included, unless there is a particularly contrary statement, and should be interpreted as further including another component, not excluding another component. Unless otherwise defined herein, all the terms used herein, which include technical or scientific terms, may have the same meaning that is generally understood by a person skilled in the art to which embodiments disclosed in the specification pertain. Terms commonly used, such as those defined in the dictionary, should be interpreted as having a meaning that is consistent with the meaning in the context of the related art and will not be interpreted as having an idealized or overly formal meaning unless expressly defined in in the specification.

Hereinabove, the above description is merely illustrative of the technical idea disclosed in the specification, and various modifications and variations may be made by one skilled in the art, to which the embodiments disclosed in the specification belong, without departing from the essential characteristic of the embodiments disclosed in the specification. Therefore, embodiments disclosed in the specification are intended not to limit but to explain the technical idea of embodiments disclosed in the specification, and the scope of the technical idea disclosed in the specification is not limited by this embodiment. The scope of protection disclosed in the specification should be construed by the attached claims, and all equivalents thereof should be construed as being included within the scope of the specification.

According to embodiments of the present disclosure, an image outputting apparatus may minimize the number of MCUs as a central processor controls each automotive part, thereby reducing a material cost.

According to embodiments of the present disclosure, the image outputting apparatus may identify an address value setting error of a driver module, thereby preventing erroneous control.

According to embodiments of the present disclosure, the image outputting apparatus may prevent data collision in a communication process as a driver module and an electronic device communicate with each other through a separate communication network.

Besides, a variety of effects directly or indirectly understood through the specification may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An image outputting apparatus comprising:

a signal processing module configured to generate an image signal and a control signal for controlling an output of the image signal and to transmit the image signal and the control signal;

a driver module configured to receive the image signal and the control signal and to control, based on the control signal, an output of an image generated from on the image signal; and an output module configured to output the image, wherein:

the driver module includes a first driver module and a second driver module, the output module includes a first output module and a second output module, the first driver module is configured to control the first output module, and the second driver module is configured to control the second output module, the driver module includes an address value setting circuit, and the address value setting circuit is configured such that the first driver module has a first address value and the second driver module has a second address value.

2. The image outputting apparatus of claim 1, wherein the address value setting circuit includes a pull-up resistor and a pull-down resistor.

3. The image outputting apparatus of claim 1, wherein:

the signal processing module is configured to transmit a query signal to the first address value or the second address value, and the first driver module or the second driver module is configured to transmit an acknowledgement signal to the signal processing module when the first driver module or the second driver module receives the query signal.

4. The image outputting apparatus of claim 3, wherein:

the signal processing module is configured to:

transmit the query signal to the first address value when the first driver module is in an on state and the second driver module is in an off state, and transmit the query signal to the second address value when the first driver module is in an off state and the second driver module is in an on state, and the first driver module or the second driver module is configured to transmit the acknowledgement signal to the signal processing module when the first driver module or the second driver module receives the query signal.

5. The image outputting apparatus of claim 1, wherein the signal processing module is configured to generate the control signal based on state information of the output module or the driver module.

6. The image outputting apparatus of claim 5, wherein the state information includes at least one of temperature information, abnormality information, and voltage level information.

7. The image outputting apparatus of claim 1, wherein the signal processing module includes:

a processor configured to generate the image signal and the control signal; and a serializer configured to receive the image signal and the control signal and to convert the image signal and the control signal into serial data, wherein the serializer includes:

an image interface configured to generate image data based on the image signal;

a control interface configured to generate control data based on the control signal; and an encoder configured to encrypt the image data and the control data.

8. The image outputting apparatus of claim 7, wherein the driver module includes:

a de-serializer configured to receive the serial data and to convert the serial data into parallel data; and a driver integrated circuit (IC) configured to control the output of the image based on the parallel data.

9. The image outputting apparatus of claim 1, wherein the signal processing module and the driver module are located remotely from each other.

10. The image outputting apparatus of claim 9, wherein the signal processing module and the driver module communicate with each other through a transmission line.

11. The image outputting apparatus of claim 1, further comprising an electronic device, wherein the driver module and the signal processing module communicate with each other through a first communication network, and wherein the driver module and the electronic device communicate with each other through a second communication network.

12. The image outputting apparatus of claim 11, wherein the electronic device includes at least one of a DC-DC converter, a temperature sensor, a motor, and a voltage sensor.

13. The image outputting apparatus of claim 1, wherein the signal processing module and the one driver module communicate with each asynchronously.

14. The image outputting apparatus of claim 13, wherein the signal processing module is configured to:

transmit the control signal to the driver module through a low frequency band; and transmit the image signal to the driver module through a high frequency band.

* * * * *